Aug. 24, 1937.  E. E. HEWITT  2,091,043
RETARDATION CONTROLLED BRAKE
Filed June 22, 1934
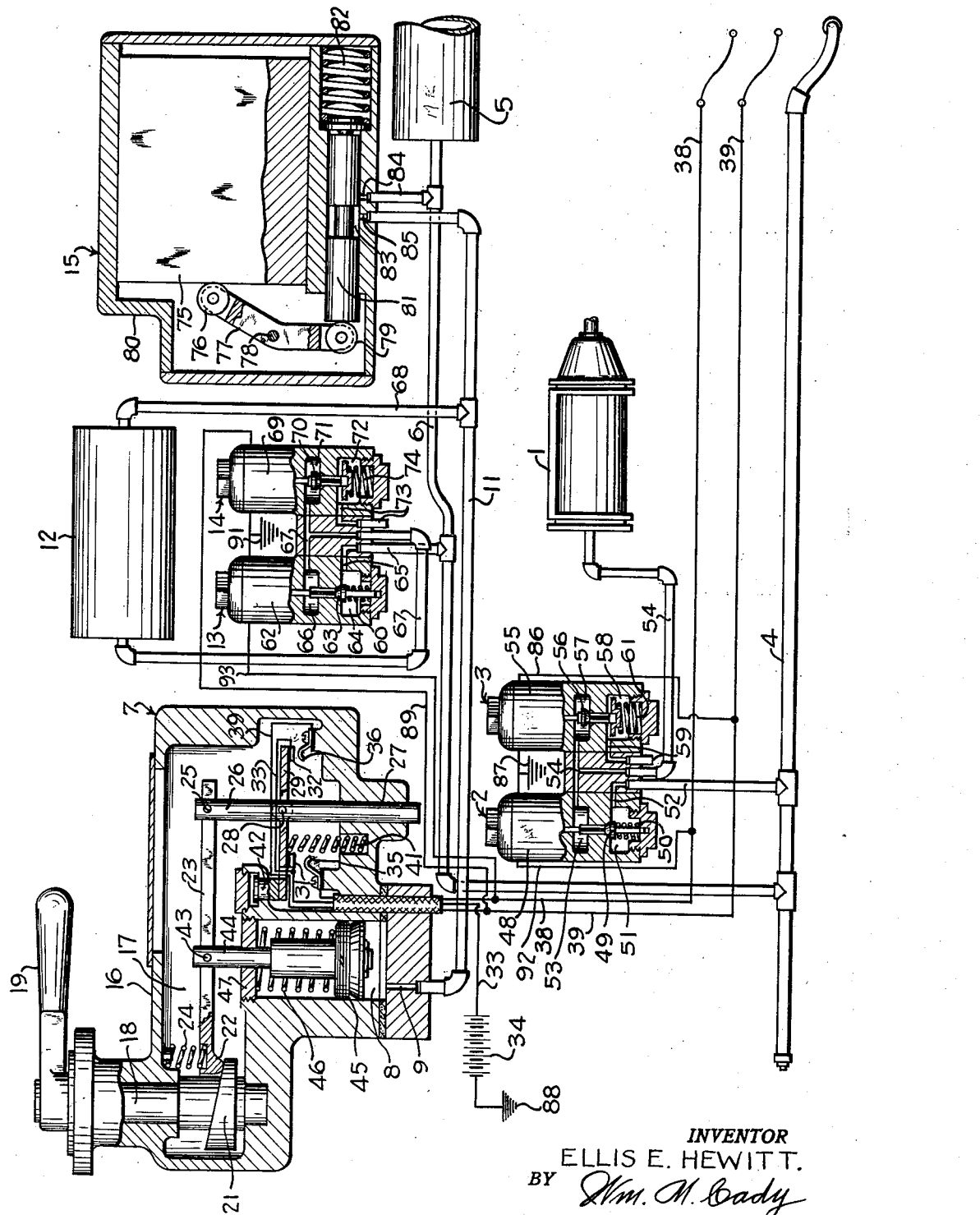
INVENTOR
ELLIS E. HEWITT.
BY Wm. M. Cady
ATTORNEY Patented Aug. 24, 1937

2,091,043

UNITED STATES PATENT OFFICE 2,091,043

RETARDATION CONTROLLED BRAKE

Ellis E. Hewitt, Edgewood, Pa., assignor to The Westinghouse Air Brake Company, Wilmerding, Pa., a corporation of Pennsylvania Application June 22, 1934, Serial No. 731,855

20 Claims. (Cl. 303—24)

My invention relates to braking equipment for vehicles and more particularly to electro-pneumatic braking equipment for high speed traction vehicles and railway trains.

In the operation of high speed trains and similar vehicles it is desirable to provide a brake equipment having ample braking capacity to take care of the most rigid requirements that the equipment will be called upon to meet. It is well known that, for a given braking pressure, friction type brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at the high speeds and, as the speed of the vehicle decreases, to so operate the brakes as to cause the braking pressure to decrease in such manner that the vehicle is brought to a stop quickly and smoothly without dangerous shock or skidding of the wheels.

It has been proposed to accomplish such varying of the braking pressure automatically by employing retardation control apparatus for varying the braking pressure in accordance with a preselected rate of retardation. This apparatus may comprise an inertia responsive device, such as a pendulum or a weight urged against the pressure of a spring, that assumes varying positions in accordance with variations in the rate of deceleration of the vehicle, and is adapted to control the degree of braking application.

In accordance with my invention, I employ an electro-pneumatic brake equipment including an electric self-lapping brake valve having a self-lapping device controlled by straight air pipe pressure and a pneumatic decelerometer for controlling the operation of the self-lapping device. The electric self-lapping brake valve may correspond to that disclosed in my copending United States patent application Serial No. 717,213, filed March 24, 1934, relating to Braking apparatus, and assigned to the same assignee as this application.

A general object of this invention is the provision of an electro-pneumatic brake equipment provided with a brake valve having a self-lapping feature controlled by a retardation controller or decelerometer.

A more specific object of this invention is the provision of means for effecting retardation control of an electric self-lapping straight air brake equipment by the use of a pneumatic decelerometer.

Further advantages and objects of my invention will appear from the following description of a specific embodiment thereof taken in connection with the accompanying drawing in which the single figure is a diagrammatic view of apparatus and circuits comprising one preferred embodiment thereof.

Referring to the drawing, the specific embodiment therein illustrated is an electro-pneumatic brake equipment comprising a brake cylinder 1, an application magnet valve device 2 and a release magnet valve device 3, that are effective to control the flow of fluid under pressure from a fluid pressure supply pipe 4 to the brake cylinder 1, and from the brake cylinder to the atmosphere. The pipe 4 is connected to a suitable source of fluid under pressure, such as a main reservoir 5, by a reservoir pipe 6. The magnet valve devices 2 and 3 are controlled by an electric self-lapping valve device 7 having a self-lapping piston chamber 8 connected through a straight air port 9 to the straight air pipe 11 that is connected to be supplied with fluid under pressure from the straight air volume reservoir 12 in response to the operation of magnet valve devices 13 and 14, and also in response to the operation of a decelerometer 15.

The electric self-lapping brake valve device 7 is provided with a casing 16 defining a chamber 17 through one end of which an operating shaft 18 extends, and is provided, at its upper end, with a brake valve handle 19. A cam 21 is carried adjacent the lower end of the shaft 18, the upper face of which engages the rounded end 22 of a floating operating lever 23, that is urged downwardly against the face of the cam by a spring 24, that is positioned between the rounded end 22 of the lever 23 and the upper wall of the casing structure. The other end of the floating lever 23 is pivotally connected by a pin 25 to a rod 26, the lower end of which interfits with a bore 27 in the casing 16, and the intermediate portion of which is pivoted by a pin 28 to a lever 29 that supports and carries movable contact members 31 and 32, that are connected by the conductor 33 to one terminal of a source of direct current energy, such as the battery 34. The contact members 31 and 32 are respectively adapted to engage the contact members 35 and 36, that are respectively connected to the train line conductors 38 and 39, that extend the length of the train for supplying current to operate application and release magnet valve devices associated with the brake equipment of each car unit that are similar in construction and operation to the devices 2 and 3. The contact carrying lever 29 is urged upwardly by a spring 41, the lower end of which is inserted in a recess in the casing structure, and the upper end of which engages the lever 29 and presses it upwardly until the left hand end thereof engages the underside of a stop 42 and the contact members 31 and 32 are moved out of engagement with the contact members 35 and 36, respectively, unless and until the lever 29 and rod 26 are urged downwardly by operation of the floating lever 23.

The floating lever 23 is pivoted at a point intermediate its ends on the pin 43 that is supported in a stem 44 extending upwardly from a self-lapping piston 45 contained in the piston chamber 8. A spring 46, positioned about the stem 44, and having its lower end in engagement with the self-lapping piston 45 and its upper end in engagement with a nut 47, urges the piston 45 downwardly to its illustrated position. The relative forces exerted by the springs 46 and 41 are such that when the left hand end 22 of the lever 23 is in its lower or illustrated position the spring 41 exerts a sufficient upward force on the lever 29 and rod 26 to effect a separation of the cooperating pairs of contact members 31 and 35, and 32 and 36, respectively.

The application magnet valve device 2 comprises a magnet 48 for operating the application valve 49, to control communication between the application valve chamber 51, that is connected by passage and branch pipe 52 to the supply pipe 4, and the chamber 53, that is connected by passage and pipe 54 to the brake cylinder 1, to control the flow of fluid under pressure to the brake cylinder. The application valve 49 is urged to its upper or seated position by a spring 50. The release magnet valve device 3 comprises a magnet 55 operatively connected to a release valve 56 for controlling communication between the release valve chamber 57, that is in open communication with the brake cylinder 1 through the passage and pipe 54, an exhaust chamber 58 that is in open communication with the atmosphere through exhaust passage and pipe 59. The release valve 56 is urged to its upper or unseated position by a spring 61.

The cut-off magnet valve device 13 comprises a magnet 62 that is operatively connected to the cut-off valve 63 for controlling communication between the cut-off valve chamber 64, that is in open communication through passage and pipe 65 with the reservoir pipe 6, and the chamber 66, that is in open communication through passage and pipe 67 with the straight air volume reservoir 12, and through pipe 68 with the straight air pipe 11. The cut-off valve 63 is urged to its upper or seated position by a spring 60 in the valve chamber 64. The release magnet valve device 14 comprises a magnet 69 for operating the release valve 70 positioned in the release valve chamber 71 and effective to control communication between the valve chamber 71 and an outlet chamber 72, that is in communication with the atmosphere through the passage and pipe 73. A spring 74 urges the valve 70 upwardly to its illustrated or unseated position. The decelerometer 15 comprises a casing 80 surrounding a slidable inertia element 75 that engages a roller 76 carried by a lever 77 that is mounted on the pivot pin 78 about which it rotates and which carries a roller 79 at its lower end that engages a slide valve 81, positioned in a bore in the lower part of the casing structure 80. A spring 82 is provided in a recess in the casing structure and urges the valve 81 to its illustrated position. Upon forward movement of the inertia element 75, occasioned by deceleration of the vehicle, the valve 81 is forced backwardly against the bias of the spring 82 effecting communication between the reservoir 5 and the straight air pipe 11 through pipe and port 84, a groove 83 in the valve 81, and the port 85.

The illustrated position of the electric self-lapping device 7 corresponds to release position in which the left end 22 of the floating lever 23 is in its lowest position on the face of the cam 21 and the several magnet valve devices are de-energized. If the operator wishes to apply the brakes, the handle 19 is moved to cause the cam 21 to rotate, thus raising the rounded end 22 of the lever 23 an amount depending upon the amount of movement of the handle 19 from its release position and which corresponds to the desired degree of application of the brakes. Upon movement of the handle 19 to rotate the cam 21 and raise the end 22 of the floating lever 23 against the bias of the spring 24, the lever 23 will fulcrum about the pin 43 forcing the rod 26 and the contact carrying lever 29 downwardly. As the lever 29 is urged downwardly the spring 41 will cause it to fulcrum about its left end, which is in engagement with the stop 42, until the contact member 32 has been brought into engagement with the contact member 36 closing a circuit from the battery 34 through conductor 33, contact members 32 and 36 and making alive the train line conductor 39 from which a circuit is completed through the branch conductor 86 and the winding of the release magnet 55 to ground at 87 to the grounded terminal 88 of the battery 34, energizing and operating the several release magnet valve devices 3 associated with the several vehicle units of the train. At the same time the release magnet valve 14 is energized through a circuit extending from the train line conductor 39, through conductor 89, the winding of the magnet 69 to ground at 91 and back to the battery 34. Upon further downward movement of the rod 26, the lever 29 fulcrums about the contact member 32 moving the left end of the lever downwardly against the bias of the spring 41 and causing the contact member 31 to be moved into engagement with the contact member 35 to close a circuit through these contact members to make alive the train line conductor 38. When the train line conductor 38 is made alive a circuit is completed through the branch conductor 92 and winding of the magnet 48 of the application magnet valve device 2, to ground at 87, and to the grounded terminal 88 of the battery 34, thus operating the application valve 49 to effect a flow of fluid under pressure from the brake pipe 4 to the brake cylinder 1. A branch circuit is also completed from the train line conductor 38, through branch conductor 93, the winding of the magnet 62 of the cut-off magnet valve device 13, to ground at 91, and to the grounded terminal 88 of the battery 34, thus energizing the magnet 62 and operating the cut-off valve 63 to its open position. The operation of the valve 63 to its open position effects communication between the reservoir 5 and the straight air volume reservoir 12 which is connected to the straight air pipe 11 through the branch pipe 68 and to the self-lapping piston chamber 8 of the brake valve 7. The self-lapping control of the magnet valve devices 2 and 3 and, consequently, the increase and decrease in pressure in the brake cylinder is controlled by the operation of the magnet valve devices 13 and 14 which operate to vary the fluid pressure in the volume reservoir 12 and the pipe 11, and therefore, in the chamber 8 of the self-lapping valve device 7. As the pressure within the chamber 8 increases, due to the flow of fluid under pressure into the straight air pipe, the piston 45 is raised causing the floating lever 23 to pivot about its left end 22 that is in engagement with the cam 21, thus raising the right end of the lever 23 and the contact carrying lever 29 until the contact member 31 is separated from the contact member 35. This interrupts communication between the battery 34 and the train line conductor 38, effecting deenergization of the cut-off magnet valve device 13 and of the several application magnet valve devices 2 associated with the several car units of the train. The deenergization of the cut-off magnet valve device 13 interrupts communication between the reservoir 5 and the straight air pipe 11, thus preventing further increase in pressure within the self-lapping chamber 8 of the brake valve device 7, the self-lapping piston 45 being maintained in a position dependent upon the differential pressures exerted by the spring 46 and the fluid under pressure within the chamber 8, which, following application of the brakes as above described, will ordinarily be such as to maintain the contact members 31 and 35 out of engagement while permitting the contact members 32 and 36 to remain in engagement. The deenergization of the magnet windings of the application magnet valve devices 2 causes operation of the application magnet valve 49 to cut off communication between the brake pipe 4 and the brake cylinder 1, thus preventing further increase in pressure within the brake cylinder. The magnet valve devices are now, therefore, in their lap positions.

The pressure within the self-lapping piston chamber 8 necessary to effect an operation of the lever 23 to interrupt the circuit through the contact members 31 and 35 and establish lap positions of the magnet valve devices is dependent upon the position of the rounded end 22 of the lever 23. For example, if the handle 19 is moved a relatively large distance away from release position, the end 22 of the lever 23 will be moved to a higher position on the face of the cam 21 than if the handle 19 is moved a lesser distance, thus effecting a greater upward movement of the pin 43 and of the piston 45, after the rod 26 and the lever 29 have been moved downwardly sufficiently to cause engagement of the contact members 31 and 35 and of the contact members 32 and 36, and thus causing a greater compression of the spring 46 than would be effected had the lever been moved only a small amount away from its release position. The upward pressure required on the lower side of the self-lapping piston 45, in order to raise the contact member 31 from the contact member 35, is correspondingly greater than would be the case had the spring 46 been only slightly compressed. Consequently, upon a relatively large movement of the handle 19 from its release position the cut-off valve 63 and the application valve 49 will remain open for a longer period of time, or until the pressure within the straight air pipe 11 and within the brake cylinder 1 has increased to a higher value, than would be the case had the handle 19 been moved a lesser distance from its release position.

If, while the brakes are applied, the rate of deceleration of the vehicle becomes greater than the value for which the decelerometer 15 has been set, the inertia element 75 will move toward the left causing the lever 77 to move about its fulcrum pin 78, moving the valve 81 toward the right to uncover the port 84 and permitting fluid under pressure to flow from the main reservoir 5 through branch pipe 84 and port 85 into the straight air pipe 11 in parallel with the path communicating from the reservoir pipe 6 through the application valve chamber 64, thus increasing the pressure within the straight air pipe 11, and within the self-lapping piston chamber 8, at a rate that is greater than the increase of pressure within the brake cylinder 1, and thus moving the self-lapping piston 45 and the floating lever 23 upwardly, the lever fulcruming about its left end 22 to raise the rod 26 and the contact carrying lever 29. Since the separation of the contact members 31 and 35 has no effect upon the valve 81, fluid under pressure continues to flow into the chamber 8 causing the piston 45 to continue to rise until the contact members 32 and 36 are separated and the release magnet valves 14 and 3 are deenergized, permitting fluid under pressure to flow to the atmosphere from the straight air pipe 11 and from the brake cylinder 1, respectively. The release of the brake, resulting from release of fluid under pressure from the brake cylinder, causes the rate of retardation of the vehicle to decrease, and, when it has decreased sufficiently that the spring 82 becomes effective to move the lever 77 about its pivot pin 78, the inertia device 75 is again moved toward the right and the valve 81 cuts off the flow of fluid under pressure from the reservoir 5 to the straight air pipe 11 and to the self-lapping piston chamber 8, permitting the piston 45 to drop until the contact members 32 and 36 are again brought into engagement to effect the closure of the release valves 70 and 56.

It will be appreciated that, after a movement of the brake handle 19 to effect application of the brakes, a further movement thereof away from the release position would effect a greater degree of application of the brakes, while a movement toward the release position will effect a lesser degree of application of the brakes.

While I have illustrated and described one preferred embodiment of my invention, it will be apparent to those skilled in the art that many changes in the circuits and apparatus described may be made within the spirit of my invention and I do not wish to be limited otherwise than by the scope of the appended claims.

Having now described my invention, what I claim as new and desire to secure by Letters Patent is:

1. In a fluid pressure brake for vehicles, in combination, a brake cylinder, electroresponsive means for controlling the supply of fluid under pressure to and the release of fluid under pressure from said brake cylinder, a manually operable member for controlling said electroresponsive means, a pressure chamber associated with said member, means responsive to the operation of said manually operable means for supplying fluid under pressure to said pressure chamber for effecting the lap operation of said electroresponsive means, and means responsive to a predetermined rate of deceleration of the vehicle for effecting the flow of fluid under pressure to said pressure chamber for effecting the operation of said electroresponsive means to release fluid under pressure from the brake cylinder.

2. In a fluid pressure brake for vehicles, in combination, a brake cylinder, electroresponsive means for controlling the supply of fluid under pressure to and the release of fluid under pressure from said brake cylinder, a manually operable member for controlling said electroresponsive means, a pressure chamber associated with said manually operable member, means responsive to the operation of said manually operable member for supplying fluid under pressure to said pressure chamber for effecting the lap operation of said electroresponsive means, and an inertia device responsive to a predetermined rate of deceleration of the vehicle for controlling the flow of fluid under pressure to said pressure chamber for effecting the operation of said electroresponsive means to release fluid under pressure from the brake cylinder.

3. In a fluid pressure brake for vehicles, in combination, a brake cylinder, electroresponsive means for controlling the supply of fluid under pressure to, and the release of fluid under pressure from, said brake cylinder, a manually operable member for controlling said electroresponsive means, a pressure chamber associated with said manually operable member, means responsive to the operation of said manually operable means for supplying fluid under pressure to said pressure chamber for effecting the lap operation of said electroresponsive means, an inertia device responsive to a predetermined rate of deceleration of the vehicle, and valve means actuated thereby for controlling the flow of fluid under pressure to said pressure chamber for effecting an operation of said electroresponsive means to limit the rate of deceleration of the vehicle.

4. In a fluid pressure brake for vehicles, in combination, a brake cylinder, electroresponsive means for controlling the flow of fluid under pressure to said brake cylinder, electric circuits for controlling said electroresponsive means, a manually operable means for controlling the energization of said circuits, a pressure chamber associated with said manually operable means, means responsive to the pressure within said chamber for also controlling the energization of said circuits, electroresponsive means also energized from said electric circuits for controlling the flow of fluid under pressure to said pressure chamber, and an inertia device responsive to a predetermined rate of deceleration of said vehicle for controlling the flow of fluid under pressure to said pressure chamber for effecting a release operation of said first electroresponsive means.

5. In a fluid pressure brake for vehicles, in combination, a brake cylinder, application and release magnet valve devices for controlling the flow of fluid under pressure to said brake cylinder, manually operable means for controlling the energization of said application and release magnet valve devices, pressure responsive means normally responsive to the degree of application of the brakes for limiting the energization of said electroresponsive means, and means responsive to a predetermined rate of deceleration of the vehicle for effecting operation of said pressure responsive means independently of the degree of application of the brakes.

6. In a fluid pressure brake for vehicles, in combination, a brake cylinder, application and release magnet valve devices for controlling the flow of fluid under pressure to and from said brake cylinder, manually operable means for controlling the energization of said application and release magnet valve devices, pressure responsive means for limiting the energization of said electroresponsive means, and magnet valve devices for limiting the degree of application of the brakes and controlled by said manually operable means jointly with said application and release magnet valve devices for controlling the flow of fluid under pressure to and from said pressure responsive means independently of the flow of fluid under pressure to and from said brake cylinder to effect corresponding changes in the pressure therein.

7. In a fluid pressure brake for vehicles, in combination, a brake cylinder, application and release magnet valve devices for controlling the flow of fluid under pressure to and from said brake cylinder, manually operable means for controlling the energization of said application and release magnet valve devices, pressure responsive means for limiting the energization of said electroresponsive means, magnet valve devices controlled by said manually operable means jointly with said application and release magnet valve devices for controlling the flow of fluid under pressure to and from said pressure responsive means for limiting the degree of application of the brakes, and means responsive to a predetermined rate of deceleration of the vehicle for effecting operation of said pressure responsive means independently of the operation of said magnet valve devices.

8. In a fluid pressure brake for vehicles, the combination with a brake cylinder, of valve means operative to open communication through which fluid under pressure is supplied to the brake cylinder, manually controlled means for effecting the operation of said valve means to open said communication, pressure responsive means for effecting operation of said valve means to close said communication, and valve means operative to open communication through which fluid under pressure is supplied to said pressure responsive means, said last named valve means being operatively controlled by said manually controlled means and by said pressure responsive means simultaneously with said last named valve means.

9. In a fluid pressure brake for vehicles, the combination with a brake cylinder, of valve means operative to open communication through which fluid under pressure is supplied to the brake cylinder, manually controlled means for effecting the operation of said valve means to open said communication, pressure responsive means for effecting operation of said valve means to close said communication, valve means operative to open communication through which fluid under pressure is supplied to said pressure responsive means, said last named valve means being operatively controlled by said manually controlled means and by said pressure responsive means simultaneously with the first named valve means, and valve means controlled in accordance with the rate of deceleration of the vehicle to open communication through which fluid under pressure is supplied to said pressure responsive means independently of said manually controlled valve means.

10. In a fluid pressure brake for vehicles, the combination with a brake cylinder, of valve means operative to open communication through which fluid under pressure is supplied to the brake cylinder, manually controlled means for effecting the operation of said valve means to open said communication, pressure responsive means for effecting operation of said valve means to close said communication, valve means operative to open communication through which fluid under pressure is released from the brake cylinder, means controlled by said pressure responsive means for effecting the operation of said last named valve means to open said communication, and valve means controlled in accordance with the rate of deceleration of the vehicle to open communication through which fluid under pressure is supplied to said pressure responsive means to limit the degree of application of the brakes independently of said manually controlled valve means.

11. In a fluid pressure brake for vehicles, the combination with a brake cylinder, of valve means operative to open communication through which fluid under pressure is supplied to the brake cylinder, manually controlled means for effecting the operation of said valve means to open said communication, pressure responsive means for effecting operation of said valve means to close said communication, valve means operative to open communication through which fluid under pressure is supplied to said pressure responsive means, valve means operative to open communication through which fluid under pressure is released from the brake cylinder, and valve means operative to open communication through which fluid under pressure is released from said pressure responsive means, the valve means for controlling the supply of fluid under pressure to said brake cylinder and the valve means for controlling the supply of fluid under pressure to said pressure responsive means being simultaneously controlled, and the valve means for controlling the release of fluid under pressure from said brake cylinder and the valve means for controlling the release of fluid under pressure from said pressure responsive means being simultaneously controlled.

12. In a fluid pressure brake for vehicles, the combination with a brake cylinder, of valve means operative to open communication through which fluid under pressure is supplied to the brake cylinder, contact means for effecting the operation of said valve means to open said communication, manually controlled means for operating said contact means, pressure responsive means for effecting operation of said contact means to close said communication, valve means operative to open communication through which fluid under pressure is supplied to said pressure responsive means, said last named means being controlled by said contact means to open and close communication simultaneously with like operation of said first named valve means, valve means operative to open communication through which fluid under pressure is released from the brake cylinder, and valve means operative to open communication through which fluid under pressure is released from said pressure responsive means, release controlling contact means for effecting simultaneous operation of said two last named valve means to open communication to release fluid under pressure from said brake cylinder and from said pressure responsive means respectively, said release controlling contact means being operatively controlled by said manually controlled means and by said pressure responsive means.

13. In a fluid pressure brake for vehicles, the combination with a brake cylinder, of valve means operative to open communication through which fluid under pressure is supplied to the brake cylinder, manually controlled means for effecting operation of said valve means to apply the brakes, means for supplying fluid under pressure to said pressure responsive means comprising a volume reservoir connected to said pressure responsive means, valve means operative to open communication through which fluid under pressure is applied to said volume reservoir, means for operating said valve means for supplying fluid under pressure to said volume reservoir simultaneously with like operation of the valve means for applying fluid under pressure to said brake cylinder.

14. In a fluid pressure brake for vehicles, the combination with a brake cylinder, of valve means operative to open communication through which fluid under pressure is supplied to the brake cylinder, valve means operative to open communication through which fluid under pressure is released from the brake cylinder, electrically operable means for controlling said two valve means to effect application and release of the brakes, manual means for controlling operation of said electrically operable means, pressure responsive means for controlling operation of said electrically operated means in accordance with the degree of application of the brakes, and inertia responsive means for controlling the supply of fluid under pressure to said pressure responsive means in accordance with the rate of deceleration of the vehicle.

15. In an electrically controlled brake for vehicles, in combination, electrically operable means for controlling the application and release of the brakes, manually operable means for controlling said electrically operable means, pressure responsive means for controlling the operation of said electrically operable means in accordance with the degree of application of the brakes, and inertia responsive means for controlling the supply of fluid under pressure to said pressure responsive means in accordance with the rate of deceleration of the vehicle.

16. In an electrically controlled brake for vehicles, in combination, electrically operable means for controlling the application and release of the brakes, manually operable means for controlling said electrically operable means, pressure responsive means for controlling the operation of said electrically operable means in accordance with the degree of application of the brakes to limit the braking force and responsive to a further increase in pressure to effect a decrease in the braking force, and inertia responsive means for controlling the supply of fluid under pressure to said pressure responsive means in accordance with the rate of deceleration of the vehicle.

17. In an electrically controlled brake for vehicles, in combination, electrically operable means for controlling the application and release of the brakes, manually operable means for controlling said electrically operable means, pressure responsive means for controlling the operation of said electrically operable means in accordance with the degree of application of the brakes, and inertia responsive means effective to open communication through which fluid under pressure is supplied to said pressure responsive means upon a predetermined rate of deceleration of the vehicle independently of the operation of said manually operable means.

18. In a fluid pressure brake for vehicles, in combination, a brake cylinder, a self-lapping brake controlling device and valve means controlled thereby operative to effect the supply of fluid under pressure to the brake cylinder and separately to a chamber, and operative upon an increase in fluid pressure in said chamber for effecting the cutting off the flow of fluid under pressure to the brake cylinder, and inertia controlled means for also varying the pressure in said chamber.

19. In a fluid pressure brake, the combination with a brake cylinder, of a self-lapping mechanism operative to effect the supply of fluid under pressure to the brake cylinder and separately to a chamber, and operative upon an increase in fluid pressure in said chamber for effecting the cutting off of the supply of fluid under pressure to the brake cylinder, and inertia controlled means for also varying the fluid pressure in said chamber.

20. In an electro-pneumatic brake, the combination with a brake cylinder, of electrically controlled means for effecting the supply of fluid under pressure to the brake cylinder, electrically controlled means for effecting the supply of fluid under pressure to a chamber independently of the brake cylinder, a self-lapping mechanism operative to control the electric current of said electrically controlled means, and operative upon an increase in fluid pressure in said chamber for causing said electrically controlled means to cut off the supply of fluid under pressure to the brake cylinder and to said chamber, and inertia controlled means for also varying the fluid pressure in said chamber.

ELLIS E. HEWITT.